United States Patent Office 3,636,141
Patented Jan. 18, 1972

3,636,141
LOW SHRINKAGE 1,2-BUTADIENE POLYMER MOLDING COMPOSITION
Charles T. O'Neill, Dover, Ronald S. Krigbaum, Ironia, and Ralph W. Nussbaum, West Orange, N.J., assignors to Allied Chemical Corporation, New York, N.Y.
No Drawing. Filed Apr. 23, 1969, Ser. No. 818,827
Int. Cl. C08d 9/00, 9/02
U.S. Cl. 260—880 R
9 Claims

ABSTRACT OF THE DISCLOSURE

Shrinkage is normally observed upon curing molding compositions based upon 1,2-butadiene polymers having at least 80% of the butadiene content combined therein in the 1,2 form. Such shrinkage in both unfilled and filled compositions can be greatly reduced without reducing the cure rate by including in the composition a normally solid thermoplastic organic resin and a normally liquid vinyl monomer in amounts of about 20–100 parts each, per 100 parts by weight of butadiene polymer. The thermoplastic resin must be at least partially incompatible with the butadiene polymer when the composition is cured. Examples of such thermoplastic resin include methyl methacrylate polymer and styrene polymer and examples of such vinyl monomer include styrene.

BACKGROUND OF THE INVENTION

This invention relates to improved curable molding compositions based upon butadiene polymers. The term "molding composition" or "molding compound" is used herein and in the appended claims in a broad sense, to include compression and transfer molding, encapsulation, coating, casting, etc.

Molding compositions from butadiene polymers are broadly known, in particular such compounds based on liquid polybutadiene or liquid butadiene-styrene copolymers containing a high proportion such as about 80% by weight of butadiene ingredient. See for example SPE Journal for March 1965, page 288. These prior art molding compounds are valuable for their high chemical resistance, thermal stability, chemical properties and electrical properties. However they suffer from a disadvantage of rather slow cure cycles at normal curing temperatures such as about 150°–170° C. using the known free-radical curing agents.

An improvement in curing rate is found upon using a polymer or copolymer of butadiene having unusually high content of the 1,2 form of the butadiene combined therein. Suitably such a polymer will have at least 80% of its butadiene content combined therein in the 1,2 form, i.e. in the form which produces a pendant vinyl group upon the polymer backbone. Such butadiene polymers of high vinyl content are known in the art, for example the syndiotactic 1,2-butadiene with practically 100% of the butadiene present in the 1,2 form is known from Natta et al. Italian Pat. 538,453 of Jan. 25, 1956. Also the isotactic and atactic forms of 1,2-polybutadiene having high content of vinyl groups are known.

1,2-butdiene polymers of high vinyl content show decidedly improved curing rates in the form of molding compounds, as compared to the above discussed 1,2-butadienes of the prior art molding compounds in which up to about 70% of the butadiene content is combined in the 1,2 form. However, the molding compounds from 1,2-polybutadiene with at least 80% of the butadiene combined in 1,2 form (hereinafter sometimes designated "high vinyl butadiene polymer") are found to undergo a high degree of volume contraction when fully cured. This volume contraction may result, when the molding composition is used to encapsulate or coat an article, in a loosening of the encapsulation or coating as the inner dimension thereof shrinks away from the article to be protected. Such behavior is a marked disadvantage in that it allows contaminants such as air and moisture to reach the article in the interior through any gaps created where the wire or supports of the article protrude through the protective covering. Even with a molding compound containing as much as 80% of a filler the shrinkage amounts to 1% or more in each linear dimension. Moreover in the production of shaped articles requiring accurate dimensions, a shrinkage as high as 1% may result in rejection of many of the finished articles.

SUMMARY

This invention provides a means of greatly reducing the shrinkage of cured high vinyl butadiene polymers and at the same time obtaining good cure rates and good resistance to chemical and thermal influences and good mechanical and electrical properties. In accordance with this invention, a curable molding composition based on high vinyl butadiene polymer comprises a blend with said polymer of a normally solid thermoplastic organic resin and a normally liquid vinyl monomer capable of promoting the cross-linking of pendant vinyl groups of said butadiene polymer. The normally solid thermoplastic resin is present in amounts, per 100 parts of butadiene polymer, of about 20–100 parts and the normally liquid vinyl monomer is likewise present in amounts of about 20–100 parts per 100 parts of butadiene polymer. The thermoplastic resin, to be effective, must be at least partially incompatible with the butadiene polymer when the composition is cured.

DESCRIPTION OF THE PREFERRED EMBODIMENTS

Preferred choices for the normally solid thermoplastic organic resin are dictated primarily by availability, since the action of this ingredient appears to be basically physical rather than chemical. Suitable resins include acrylic polymers, styrene polymers, polyvinyl chlorides, polyvinyl acetates, and cellulosics. Mixtures of these resins can be used.

It is to be understood that throughout this specification and in the claims, when the term "polymer" is used this is to be understood in a sense to include not only homopolymers but also copolymers or interpolymers such as random copolymers, alternating copolymers, block copolymers, and graft copolymers. When specific names are cited, the polymers are to be understood as composed of at least a major proportion of the named constituent.

The vinyl monomer employed is of the type known to react with pendant vinyl groups. Such monomers include in particular styrene, vinyl toluene, divinyl benzene, ethylene di-methacrylate, and diallyl phthalate. A combination of resin and vinyl monomer such that the resin is soluble to at least about 20% by weight solids in the vinyl monomer at blending temperatures should be used. Such combination facilitates the blending operation and is probably significant also in obtaining the anti-shrinking effect of the invention.

The molding composition of the invention is suitably cured with the use of a free-radical curing agent. Preferred curing agents are those which remain inactive at temperatures suitable for blending the butadiene polymer, the molding resin and the vinyl monomer with the curing agent, such as about 50° C.–150° C. Particularly suitable curing agents are found in the more stable dialkyl peroxide and diaryl peroxide class exemplified by 2.5-dimethyl-2,5-bis(tertiary-butyl peroxy) hexane, and di-alpha-cumyl peroxide; and also like compounds wherein an alkyl group is unsaturated, such as 2,5-dimethyl-2,5-bis(t.-butyl peroxy) hexyne-3.

For many purposes it is desirable to employ a filler in a molding compound from the molding composition of the invention, such as glass fiber, asbestos, finely divided silica, clay, alumina, calcium carbonate, talc, powdered graphite, or the like. A mold lubricant will also generally be utilized, such as calcium stearate or zinc stearate.

EXAMPLE

A syndiotactic polybutadiene homopolymer wherein at least 90% of the butadiene content was combined in the 1,2 form was employed as the base of a molding composition (100 parts by weight). This butadiene polymer was blended with normally solid methyl methacrylate resin on a heated roll mill for about 1 minute at about 93° C. The specific methyl methacrylate resin was a commercially available copolymer of methyl methacrylate with a minor proportion of ethyl acrylate ("Acryloid" B–66A), used in amount of 50 parts by weight per 100 parts of butadiene polymer. Then while the roll milling continued, styrene monomer in amount of 50 parts by weight, 300-mesh powdered silica filler in amount of about 850 parts by weight, di-alpha-cumyl peroxide curing agent in amount of 10 parts by weight, and zinc stearate mold lubricant (2.8 parts by weight) were added to the blend and mixed for about 2 minutes. A sheet of the blended ingredients was removed from the mill and granulated to produce a molding compound.

This molding compound was molded in the apparatus used for the ASTM flow cup test (ASTM D–731–57). The molding compound showed satisfactory flow in this test.

The molded cup was cured by heating for 4 minutes at 159° C. The cup was removed from the mold and tested for level of cure by a method in which the rigidity of the cup was measured. The cup was compared with a control produced by using the same butadiene polymer cured to heat distortion temperature of at least 250° C., produced using 200 parts of butadiene polymer and no thermoplastic resin or vinyl monomer. The rigidity of the two cups was essentially the same; if anything, the cup of the invention was more rigid, indicating that cure was adequate in the 4-minute time to assure good resistance to elevated temperatures.

Shrinkage of the molded cup of the invention was visibly less severe than that of the control cup and was at an acceptable level. The shrinkage was determined quantitatively for the molding compound produced with the composition of the invention as against the control molding compound by compression molding bars of each compound in a 6-inch mold and observing the contraction in length in the cured molded bar. For the control compound the contraction amounted to 1.2% (undesirably high); whereas for the molding compound made with the composition of the invention the shrinkage was only 0.3%, which is a satisfactory level.

When normally solid polystyrene resin is substituted in the procedure of the foregoing example for methyl methacrylate resin, generally similar results are obtained.

The 1,2-polybutadiene employed in the above example was prepared as follows:

A three neck flask equipped with a magnetic stirrer is purged free of air with dry nitrogen. To the flask is added 1.5 g. (0.0042 mole) of cobaltic acetylacetonate, followed by 2 ml. of butadiene liquefied at 0° C. To the catalyst is added 100 ml. of benzene. The mixture is stirred and maintained at a temperature of 17° C.–20° C.; whereupon 1.5 g. (0.0130 mole) of aluminum triethyl is added. After stirring for 30 minutes the contents of the flask are transferred under a purge of nitrogen to a loading device for attachment and charging to the reactor.

A second loader is charged with 2095 g. of butadiene and 2 ml. (0.0122 mole) of diethyl fumarate. Both loaders are attached to a clean dry one-gallon glass lined autoclave which has been purged with nitrogen for 15 minutes. To the reactor is added 525 g. of butadiene. Stirring is started and cooling water is circulated around the reactor jacket until the temperature is 20° C.–25° C. The pressure is approximately 30 p.s.i.g. The catalyst solution is added by gravity from the other loader to the reactor. After 15 minutes, an additional 525 g. of butadiene is fed to the reactor. Addition is continued at 15-minute intervals until all the monomer has been added. The reaction is continued so that the total time is 4 hours.

At the end of this period the product is discharged through the bottom of the reactor into a second vessel equipped with a vent line for unreacted monomer. This vessel contains 2 liters of isopropyl alcohol and 50 ml. of hydrochloric acid. A nitrogen purge is attached to the reactor to pass through the bottom discharge line below the surface of the liquid in the lower vessel. The purge is conducted for 15 minutes. The product is filtered from the deactivation medium and transferred to a blender (Waring) containing 1.5 liters of isopropyl alcohol and 3.4 g. of a comercial hindered polyphenol antioxidant ("Irganox" 1076). The resin is blended for 15 minutes and filtered. It is transferred to trays and dried in a vacuum oven at 50° C. for 6 hours. There is obtained 680 g. of a white granular product. The resin has a reduced viscosity of 0.40 as measured at 1% conc. in Decalin at 80° C., which corresponds to a number average mol. wt. of approximately 11,000.

We claim:

1. An improved curable molding composition comprising butadiene polymer, said butadiene polymer having at least 80% of its butadiene content combined therein in the 1,2 form; wherein the improvement comprises a blend with said polymer of a normally solid thermoplastic organic resin at least partially incompatible with said butadiene polymer when the composition is cured, and a normally liquid vinyl monomer capable of promoting the cross-linking of pendant vinyl groups of said butadiene polymer; said thermoplastic resin and said vinyl monomer each independently being present in amounts, per 100 parts by weight of butadiene polymer, of about 20 to about 100 parts by weight.

2. Composition of claim 1 wherein said butadiene polymer is 1,2-polybutadiene homopolymer and said thermoplastic organic resin is soluble to at least about 20% by weight solids in said vinyl monomer at blending temperatures.

3. Composition of claim 2 wherein said vinyl monomer is styrene.

4. Composition of claim 3 wherein said thermoplastic resin is a methyl methacrylate polymer.

5. Composition of claim 3 wherein said thermoplastic resin is a styrene polymer.

6. In a process of producing a shaped article from a composition comprising butadiene polymer and free-radical curing agent, said butadiene polymer having at least 80% of its butadiene content combined therein in the 1,2 form, the improvement which comprises blending said polymer and said curing agent with a normally solid thermoplastic organic resin at least partially incompatible with said butadiene polymer when the composition is cured and with a normally liquid vinyl monomer capable of promoting the cross-linking of pendant vinyl groups of said butadiene polymer, said thermoplastic resin and said vinyl monomer each independently being present in amounts, per 100 parts of butadiene polymer, of about 20 to about 80 parts by weight.

7. Process of claim 6 wherein said vinyl monomer is styrene, and the blending is effected at temperatures in the range 50° C.–150° C.

8. Process of claim 7 wherein said thermoplastic resin is a methyl methacrylate polymer.

9. Process of claim 7 wherein said thermoplastic resin is a styrene polymer.

References Cited

UNITED STATES PATENTS

| 3,438,933 | 4/1969 | Bartsch | 260—880 X |
| 3,461,188 | 4/1969 | Baer | 260—880 X |
| 3,499,059 | 3/1970 | Molau et al. | 260—888 X |

FOREIGN PATENTS

| 854,615 | 11/1960 | Great Britain | 260—880 |

JOSEPH L. SCHOFER, Primary Examiner

W. F. HAMROCK, Assistant Examiner

U.S. Cl. X.R.

260—887